(12) United States Patent
Yuan et al.

(10) Patent No.: US 9,841,516 B1
(45) Date of Patent: Dec. 12, 2017

(54) MEASUREMENT SYSTEM, CALIBRATION AND MEASUREMENT METHOD FOR BULK RADIATION WASTES

(71) Applicant: Institute of Nuclear Energy Research, Atomic Energy Council, Executive Yuan, R.O.C., Taoyuan (TW)

(72) Inventors: Ming-Chen Yuan, Zhongli (TW); Wun-Jhih Huang, Taoyuan (TW); Ping-Ji Huang, Taoyuan (TW); Chin-Hsien Yeh, Taoyuan (TW)

(73) Assignee: INSTITUTE OF NUCLEAR ENERGY RESEARCH, ATOMIC ENERGY COUNCIL, EXECUTIVE YUAN, R.O.C., Taoyuan (TW)

( * ) Notice: Subject to any disclaimer, the term of this patent is extended or adjusted under 35 U.S.C. 154(b) by 0 days.

(21) Appl. No.: 15/227,371

(22) Filed: Aug. 3, 2016

(51) Int. Cl.
  *G01D 18/00* (2006.01)
  *G01T 7/00* (2006.01)
  *G01T 1/36* (2006.01)

(52) U.S. Cl.
  CPC ............... *G01T 7/005* (2013.01); *G01T 1/36* (2013.01)

(58) Field of Classification Search
  CPC ...................................................... G01T 1/167
  See application file for complete search history.

(56) References Cited

U.S. PATENT DOCUMENTS

| | | | |
|---|---|---|---|
| 7,479,628 B1* | 1/2009 | Yeh ................. | G01T 1/169 250/252.1 |
| 2008/0087807 A1* | 4/2008 | Yeh ................. | G01D 18/00 250/252.1 |
| 2010/0054421 A1* | 3/2010 | Yeh ................. | G01T 7/005 378/193 |

* cited by examiner

*Primary Examiner* — Kiho Kim
(74) *Attorney, Agent, or Firm* — Locke Lord LLP; Tim Tingkang Xia, Esq.

(57) ABSTRACT

The invention provides a calibration method for bulk radiation wastes. The calibration method for bulk radiation method for bulk radiation wastes including the following steps. First, pluralities of objects are provided. Then, the plurality of objects arranged into calibration member. In addition, a measurement system and a measurement method for bulk radiation wastes are provided.

16 Claims, 10 Drawing Sheets

MEASUREMENT SYSTEM, CALIBRATION AND MEASUREMENT METHOD FOR BULK RADIATION WASTES

FIELD OF THE INVENTION

The present invention relates to a measurement system and a calibration/measurement method, and more particularly, to an in-situ gamma spectroscopy, a measurement system for measuring a variety of reference objects of block-models or multi-piece bulk radiation wastes, and a method for calibrating and measuring bulk radiation wastes.

BACKGROUND OF THE INVENTION

Conventionally, the activity of a bulk radiation waste is measurement by the use of a container-style detection system that is located at a fixed place. However, the container-style detection system is generally composed of a plurality of scintillator detectors that can be very costly to establish. In addition, since the area in the container-style detection system for housing objects to be detected is limited, the detected object that is too large has to be divided and kept separately in barrels or boxes for preparing the same to be carried in batch to the container-style detection system for measurement. Moreover, the container-style detection system can only be used for measuring radiation specific activity (Bq/kg) and is not capable of identifying radionuclides. Therefore, the radiation measurement methods that are currently available are not easy and convention to apply for decommissioning a nuclear facility in real world, not to mention that a permanent site must be provided and acquired in advance for the container-style detection system.

SUMMARY OF THE INVENTION

An object of the present invention is to provide an on-site measurement system for measuring total activity and surface activity of a bulk radiation waste by the use of an in-situ gamma spectroscopy, and thereby not only the time wasted for transporting objects to be detected to a conventional container-style detection system can be saved, but also the objects that are too large no longer have to be divided into barrels or boxes so as to be carried in batch to the container-style detection system for measurement. Consequently, the cost for purchasing the container-style detection system and the cost for acquiring a fixed location for housing the container-style detection system can be saved.

Another object of the present invention is to provide a block-model method for arranging a plurality of barrel-like or box-like objects into a variety of reference blocks, or a plurality of small slice-like standard radioactive sources into a large-area slice-like reference object, for mimicking the surface or the interior of a bulk radiation waste from a nuclear facility that is to be decommissioned. Thereby, a calibration volume-source or a calibration slice-source can be established, and the parameters of a detected objects that are required in an activity measurement of an in-situ gamma spectroscopy, such as size, volume, shell thickness, weight, texture, and distance, can be acquired for enabling the surface activity or total interior activity a bulk radiation waste to be measured accurately.

In an embodiment, the present invention provides a measurement system for bulk radiation wastes. The measurement method for bulk radiation wastes comprises: a calibration member and an in-situ gamma spectroscopy, in which the calibration member is composed of a plurality of objects that are assembled and arranged into the calibration member, and the in-situ gamma spectroscopy is composed of a detector and a standard unit in a manner that the detector is coupled to the standard unit and is used for detecting the surface activity or total interior activity of the calibration member by comparing the detected surface activity or total interior activity with those of the standard unit.

In another embodiment, the present invention provides a calibration method for bulk radiation wastes. The calibration method for bulk radiation wastes including the steps of: providing a plurality of objects; and arranging the plural objects into a calibration member. In addition, the plural objects can be stacked into a block to be used as the calibration member, or if each of the objects is a slice-like piece, they can be arranged and assembled into a large-area slice-like calibration member.

In further another embodiment, the present invention provides a measurement method for bulk radiation wastes, which comprises the steps of: providing a calibration member and an in-situ gamma spectroscopy, while allowing the calibration member to be composed of a plurality of objects that are stacked into a block or a plurality of slices that are assembled into a large-area slice-like object, and enabling the in-situ gamma spectroscopy to include a detector and a standard unit; and enabling the detector to detect the surface activity or total interior activity of the calibration member by comparing the detected surface activity or total interior activity with those of the standard unit.

To sum up, the present invention provide a measurement system, a calibration method and a measurement method for bulk radiation wastes, which can be used for measuring total activity and surface activity of a bulk radiation waste by the use of an in-situ gamma spectroscopy, and thereby not only the time wasted for transporting objects to be detected to a conventional container-style detection system can be saved, but also the objects that are too large no longer have to be divided into barrels or boxes so as to be carried in batch to the container-style detection system for measurement. Consequently, the cost for purchasing the container-style detection system and the cost for acquiring a fixed location for housing the container-style detection system can be saved.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
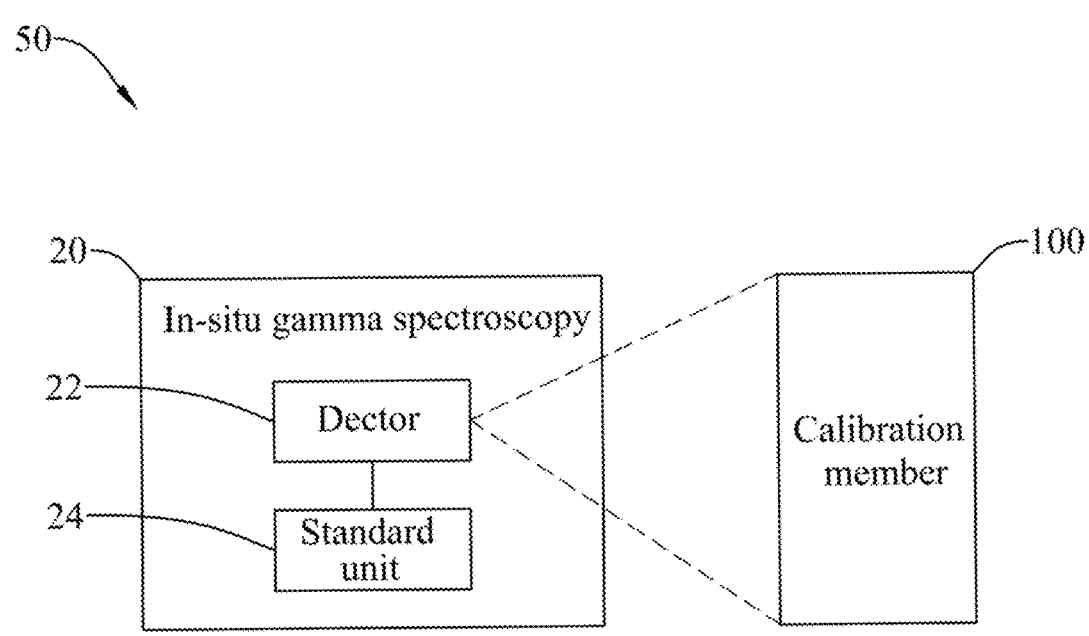
FIG. 1 is a schematic diagram showing a measurement system for bulk radiation wastes according to the present invention.

Please refer to FIG. 1, which is a schematic diagram showing a measurement system for bulk radiation wastes according to the present invention.

In this embodiment, the measurement system for bulk radiation wastes includes a calibration member 200 and an in-situ gamma spectroscopy 20.

The in-situ gamma spectroscopy 20 is composed of a detector 22 and a standard unit 24, in which the detector 22 is coupled to the standard unit 24. Moreover, the in-situ gamma spectroscopy 20 can be mounted on a trolley for allowing the same to be moved to an on-site location where a bulk radiation waste 100 is disposed. However, the in-situ gamma spectroscopy 20 can also be moved manually without having to be mounted on a trolley, and thus it is not limited to the above description.

The detector 22 is used for detecting the surface activity or total interior activity of the calibration member. The standard unit 24 formed with geometrical parameters conforming to an object to be detected, such as the calibration member 100, whereas the geometrical parameters include size, volume, shell thickness, weight, texture, and distance. The detection result of the detector 22 is then compared with the surface activity or total interior activity of the standard unit 24.

It is noted that the abovementioned calibration member 100 can be an assembly of a number of objects, that can be illustrated in FIG. 2A~FIG. 6.

Figure 2A:
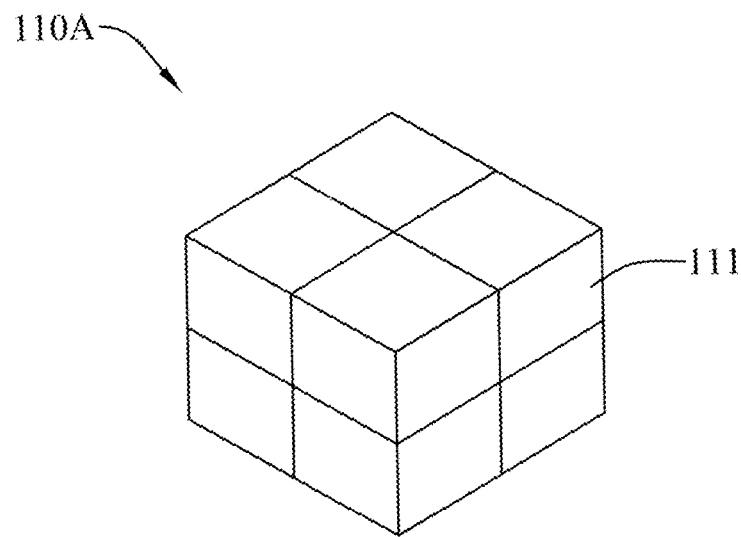
FIG. 2A and FIG. 2B are schematic diagrams showing respectively two calibration members according to one embodiment of the present invention.
Figure 2B:
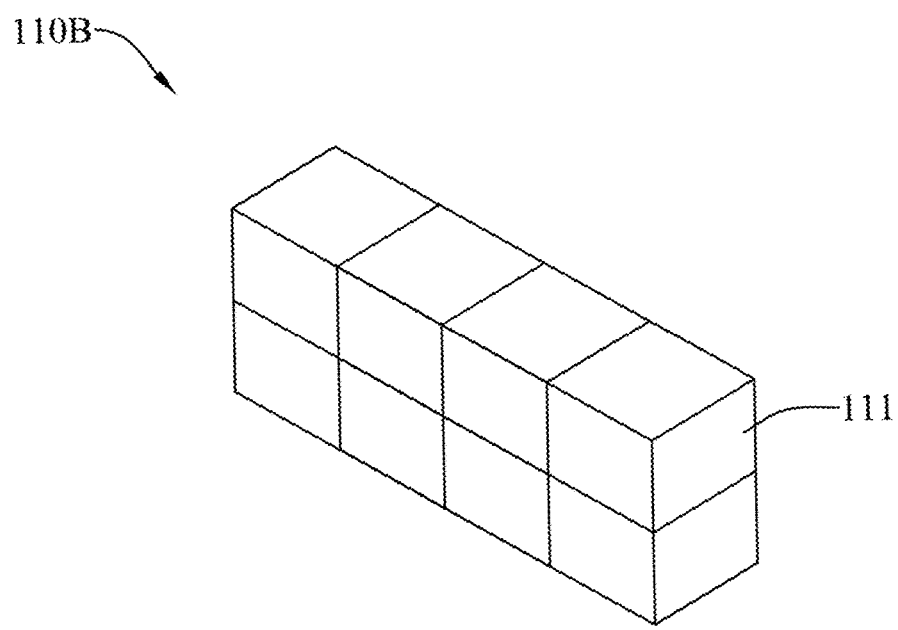

Please refer to FIG. 2A and FIG. 2B, which are schematic diagrams showing respectively two calibration members according to one embodiment of the present invention.

In this embodiment, the calibration members 110A and 110B are respectively an assembly of a plural objects 111, whereas each of the plural objects 111 is capable of passing a comparison of activity measurement, and the plural objects 111 are stacked into the calibration members 110A and 110B so as to be used for calibrating the whole-body distribution of internal radioactivity.

In FIG. 2A, each of the plural objects 111 is a box-like object, whereas the plural box-like objects 111 are stacked into a cube. In this embodiment, each side of the cube is 68 cm, and thus the volume of the cube is 314 L. It is noted that there is no restriction relating to the size of the cube, and thus it is not limited by the above embodiment.

In FIG. 2B, each of the plural objects 111 is a box-like object, whereas the plural box-like objects 111 are stacked into a cuboid.

Accordingly, the calibration member is substantially an assembly of a number of box-like objects that each is capable of passing a comparison of activity measurement, while the assembly can be formed according to a block-model method. Thereby, the cuboid illustrated in FIG. 2B or the cube illustrated in FIG. 2A can be simulated and formed. Similarly, the volume of the cuboid shown in FIG. 2B is about 320 L, but since there is no restriction relating to the size of the cuboid, and thus it is not limited by the above embodiment.

Please refer to FIG. 3A~FIG. 3F, which are schematic diagrams showing respectively various calibration members according to another embodiments of the present invention.

In this embodiment, the calibration members 120A~120F are respectively an assembly of a plural objects 121, whereas each of the plural objects 121 is capable of passing a comparison of activity measurement, and the plural objects 121 are stacked into the calibration members 120A~120F so as to be used for calibrating the whole-body distribution of internal radioactivity.

Figure 3A:
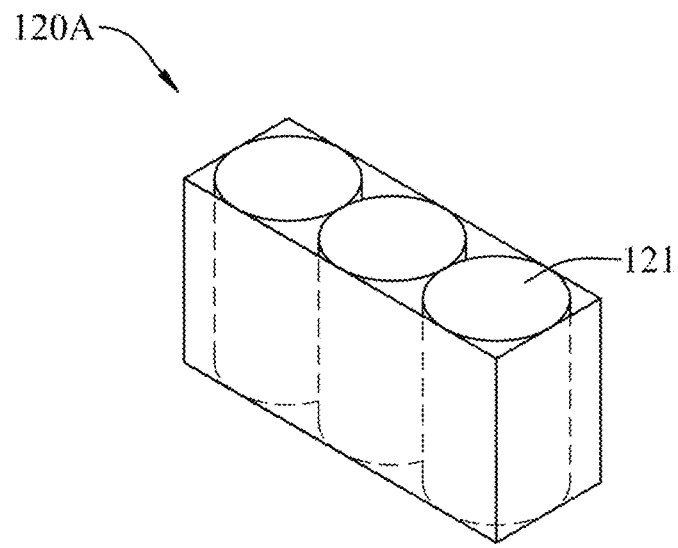
FIG. 3A~FIG. 3F are schematic diagrams showing respectively various calibration members according to another embodiments of the present invention.
Figure 3B:
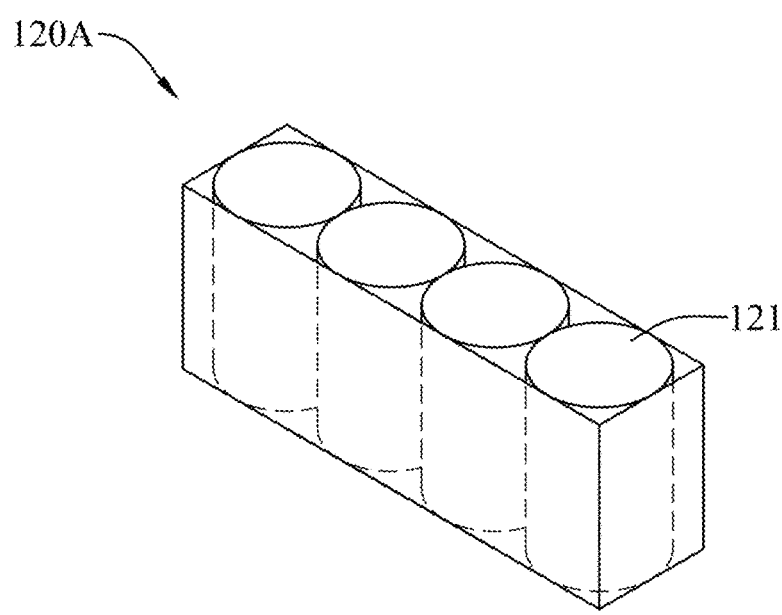
Figure 3C:
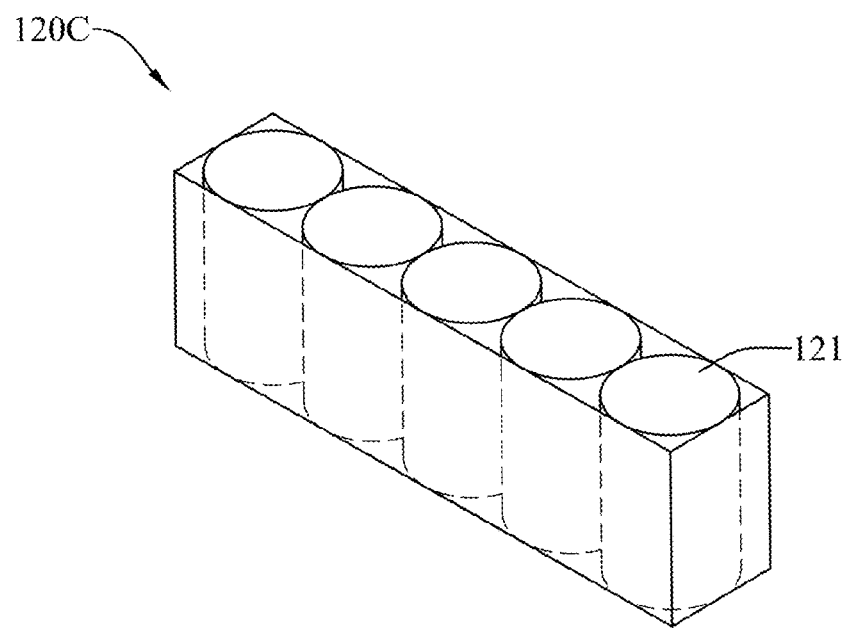

As shown in FIG. 3A~FIG. 3F, each of the plural objects 121 is a barrel-like object, such as a 55-gallon barrel, whereas the plural barrel-like objects 121 are stacked into a cubical object. In FIG. 3A, the cubical object is composed of three barrel-like objects 121 that are stacked into a cuboid 120A. In FIG. 3B, the cubical object is composed of four barrel-like objects 121 that are stacked into a cuboid 120B. In FIG. 3C, the cubical object is composed of five barrel-like objects 121 that are stacked into a cuboid 120C. From the above embodiments, it is noted that the calibration members 120A~120C are respectively an assembly of a plural objects 121, whereas each of the plural objects 121 is capable of passing a comparison of activity measurement, and the plural objects 121 are stacked into the calibration members 120A~120C in a volume ranged between 1000 L to 1500 L, as shown in FIG. 3A~FIG. 3C.

Figure 3D:
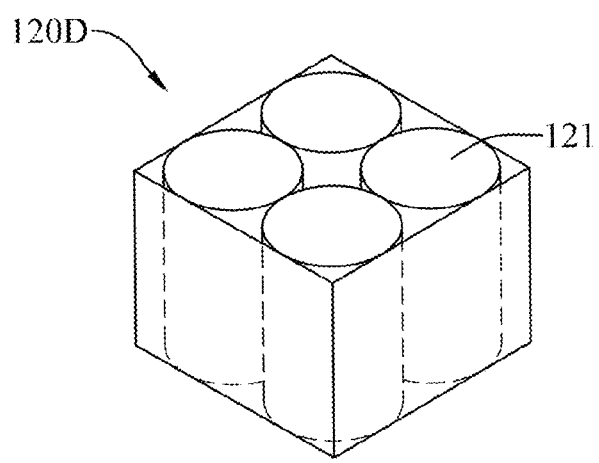
Figure 3E:
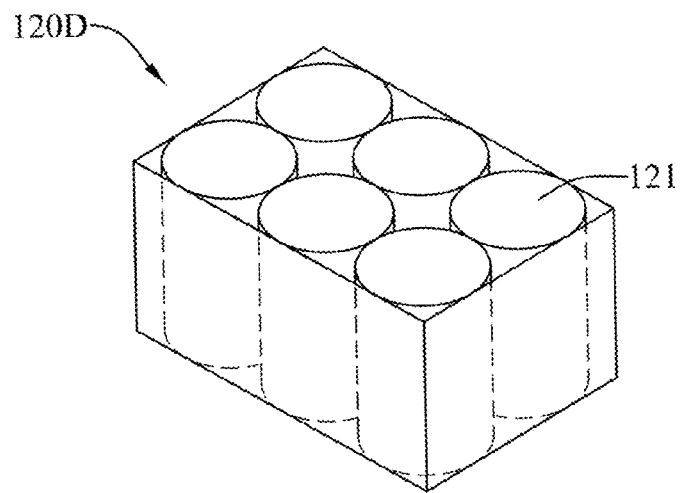
Figure 3F:
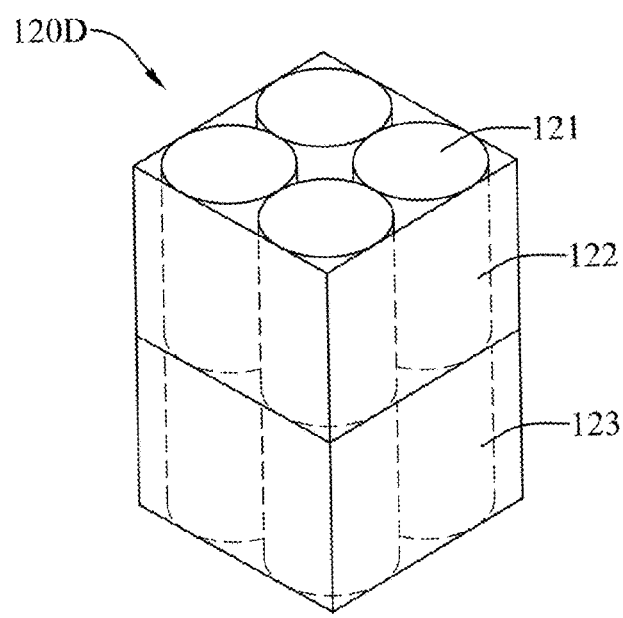

Nevertheless, the shape of the assembly is not limited to the cuboid. In the embodiment shown in FIG. 3D, the cubical object is composed of four barrel-like objects 121 that are stacked into a cube 120D. In FIG. 3E, the cubical object is composed of six barrel-like objects 121 that are stacked into a cube 120E. In FIG. 3F, the cubical object is composed of eight barrel-like objects 121 that are stacked into a cube 120F in a manner that four out of the eight barrel-like objects are used for forming a first cube 122, and the other four are used for forming a second cube 122, while allowing the first cube 122 to be stacked on top of the second cube 123. From the above embodiments, it is noted that the calibration members 120D~120F are respectively an assembly of a plural objects 121, whereas each of the plural objects 121 is capable of passing a comparison of activity measurement, and the plural objects 121 are stacked into the calibration members 120D~120F in a volume ranged between 1200 L to 2500 L, as shown in FIG. 3D~FIG. 3F.

Please refer to FIG. 4A~FIG. 4E, which are schematic diagrams showing respectively various calibration members according to yet another embodiments of the present invention.

In this embodiment, the calibration members 130A and 130E are respectively an assembly of a plural objects 131, whereas each of the plural objects 131 is capable of passing a comparison of activity measurement, and the plural objects 131 are stacked into the calibration members 130A and 130E so as to be used for calibrating the whole-body distribution of internal radioactivity.

Figure 4A:
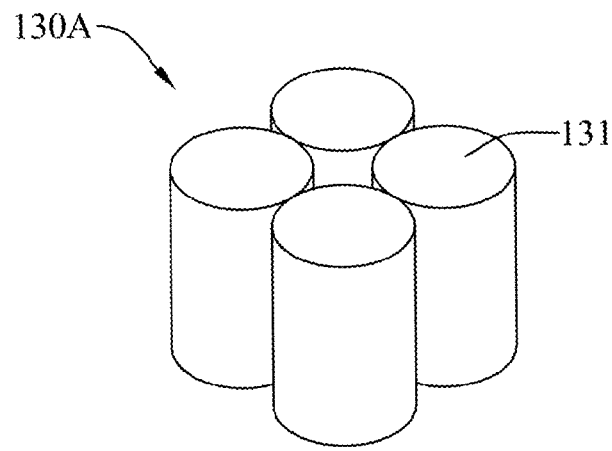
FIG. 4A~FIG. 4E are schematic diagrams showing respectively various calibration members according to yet another embodiments of the present invention.
Figure 4B:
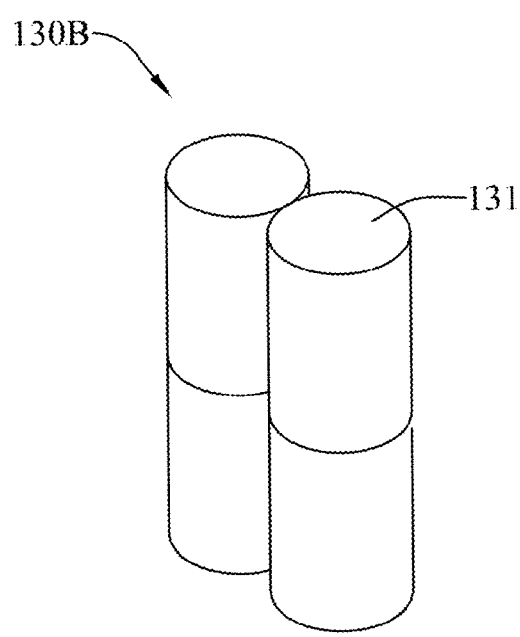
Figure 4C:
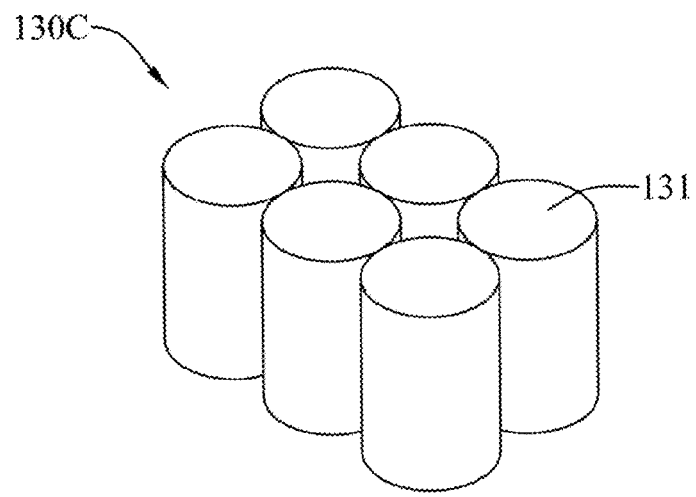
Figure 4D:
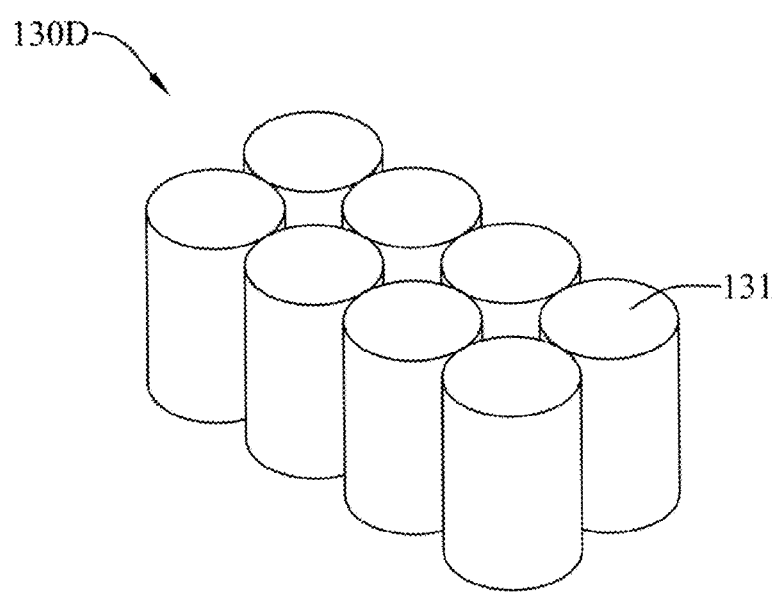
Figure 4E:
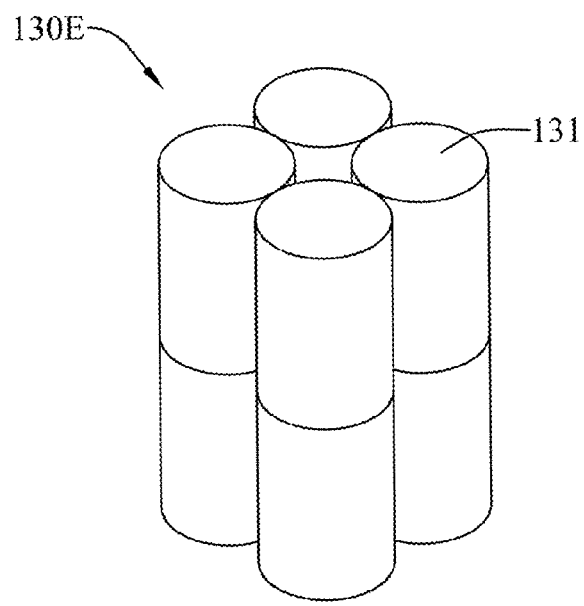

As shown in FIG. 4A~FIG. 4E, each of the plural objects 131 is a barrel-like object, whereas the plural barrel-like objects 131 are stacked into a cubical object, and the cubical object is an object selected from the group consisting of: a cube, a cube of four barrel-like objects, a cuboid of six barrel-like objects, a cuboid of eight barrel-like objects, and a cube of eight barrel-like objects. In FIG. 4A, the plural barrel-like objects 130A is stacked into a cube. In FIG. 4B, the plural barrel-like objects 130B is stacked and into a cube of four barrel-like objects 131B. In FIG. 4C, the plural barrel-like objects 130C is stacked and into a cuboid of six barrel-like objects 131C. In FIG. 4D, the plural barrel-like objects 130D is stacked and into a cube of eight barrel-like objects 130E. In FIG. 4E, the plural barrel-like objects 130E is stacked and into a cuboid of eight barrel-like objects 130E.

As shown in FIG. 2A~FIG. 4E, a calibration member is formed by the use of a block-model method so as to be used as a calibration volume-source, but it is not limited thereby, as illustrated in the following FIG. 5 and FIG. 6.

Figure 5:
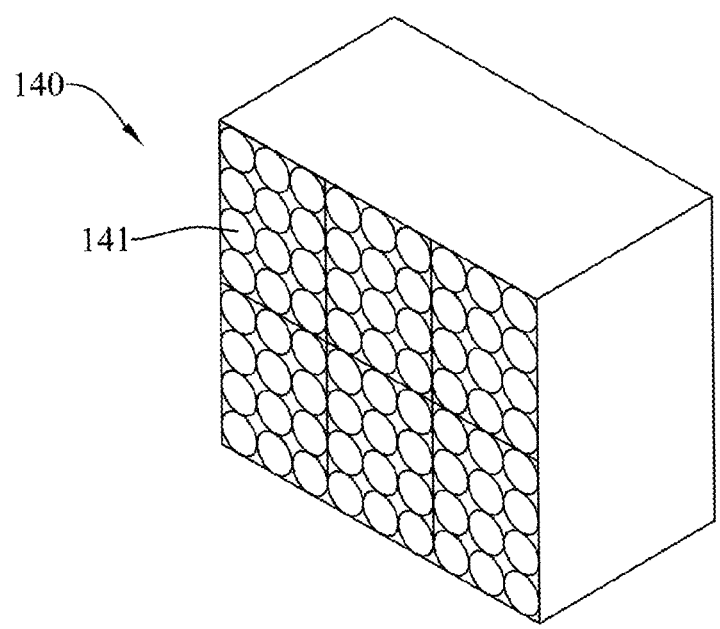
FIG. 5 is a schematic diagram showing a calibration member according to an embodiment of the present invention.

FIG. 5 is a schematic diagram showing a calibration member according to an embodiment of the present invention.

Figure 6:
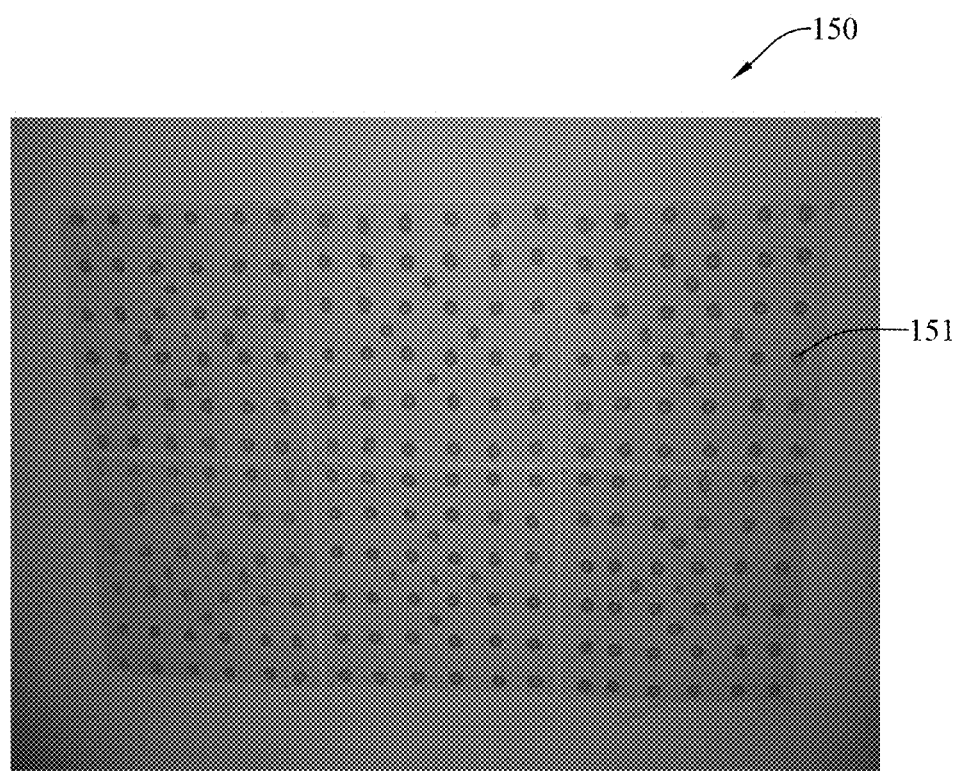
FIG. 6 is a schematic diagram showing a calibration member according to another embodiment of the present invention.

FIG. 6 is a schematic diagram showing a calibration member according to another embodiment of the present invention.

As shown in FIG. 6, a calibration member 150 of the present invention is applied for calibrating surface radioactive contamination of a larger object that can be made of various materials or a concrete wall.

Figure 7:
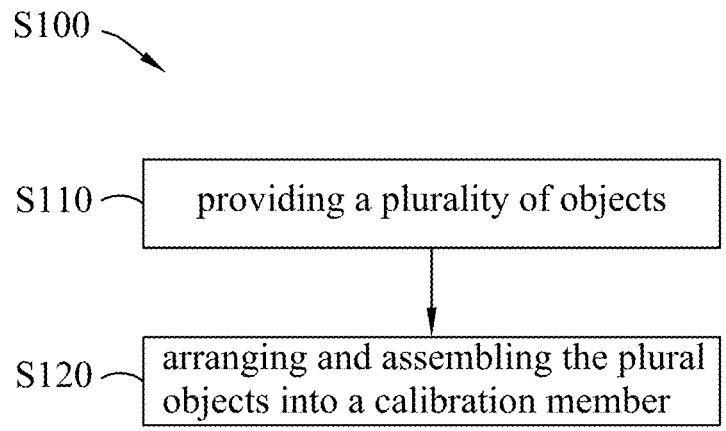
FIG. 7 is flow chart depicting steps performed in a calibration method for bulk radiation wastes according to the present invention.

FIG. 7 is flow chart depicting steps performed in a calibration method for bulk radiation wastes according to the present invention.

As shown in FIG. 7, the steps performed in a calibration method for bulk radiation wastes include step S110 to step S120.

At step S110, a plurality of objects are provided.

In an embodiment, each of the aforesaid objects is capable of passing a comparison of activity measurement, such as the box-like objects disclosed in FIG. 2A and FIG. 2B, or the barrel-like objects disclosed in FIG. 3A to FIG. 4E.

In another embodiment, the aforesaid objects are slice-like objects 141, as those shown in FIG. 5, whereas each of the slice-like objects 141 conforms to a national radioactivity standard of Cs-137 and Co-60.

TABLE 1

Difference between a standard activity and
a barrel measurement

| Barrel No. | Co-60 difference (%) | Cs-137 difference(%) |
|---|---|---|
| 1 | 4.4 | 5.8 |
| 2 | 6.3 | 6.4 |
| 3 | 4.2 | 8.9 |
| 4 | 6.4 | 6.1 |
| 5 | 8.3 | 6.6 |
| 6 | 6.5 | 8.7 |
| 7 | 4.3 | 2.2 |
| 8 | 6.3 | 7.7 |

One objective of this embodiment is to measure the eight barrels which contain Cs-137 and Co-60 solutions of known radioactivities and then to compare those result of measurement with a standard radioactivity so as to obtain the differences. As shown in Table 1, the maximum Cs-137 difference is small than 9% and the maximum Co-60 difference is small than 8%, which are all ranged within a reasonable tolerance.

At step S120, arranging and assembling the plural objects into a calibration member.

In one embodiment of the present invention, the plural objects are stacked into a calibration member so as to be used for calibrating the whole-body distribution of internal radioactivity.

As shown in FIG. 2A and FIG. 2B, each object 111 is a box-like object, whereas the plural box-like objects 111 are stacked into either a cube of FIG. 2A, or a cuboid of FIG. 2B, both in a volume of about 320 L.

As shown in FIG. 3A~FIG. 3F, each of the plural objects 121 is a barrel-like object, such as a 55-gallon barrel, whereas the plural barrel-like objects 121 are stacked into a cubical object. In FIG. 3A~FIG. 3C, the volume of the cubical object is about 1000 L~1500 L, and in FIG. 3D~FIG. 3F, the volume of the cubical object is about 1200 L~2500 L.

As shown in FIG. 4A~FIG. 4E, each of the plural objects 131 is a barrel-like object, whereas the plural barrel-like objects 131 are stacked into a cubical object, and the cubical object is an object selected from the group consisting of: a cube, a cube of four barrel-like objects, a cuboid of six barrel-like objects, a cuboid of eight barrel-like objects, and a cube of eight barrel-like objects.

TABLE 2

Gamma Radioactivity Measurement of Simulated Large Objects

| Simulated Shape | Co-60 difference (%) | Cs-137 difference (%) |
|---|---|---|
| Cube | −21.2 | −22.2 |
| Cube of four barrel-like objects | −15.8 | −17.0 |
| Cuboid of six barrel-like objects | −15.0 | −15.4 |
| Cuboid of eight barrel-like objects | −16.1 | −13.9 |
| Cube of eight barrel-like objects | −22.5 | −21.5 |

One objective of this embodiment is to measure the five calibration members 130A~130E and then to compare those result of measurement with barrels containing Cs-137 and Co-60 solutions so as to obtain the differences. As shown in Table 2, the maximum Cs-137 difference is small than −22% and the maximum Co-60 difference is small than −23%, which are all ranged within a reasonable tolerance.

TABLE 3

Radioactivity Measurement of Simulated Large
Object (Concrete)

| Simulated Shape | Cs-137 difference (%) |
|---|---|
| Cube | −17.7% |
| Cube of four barrel-like objects | −19.3% |
| Cuboid of six barrel-like objects | −15.6% |
| Cuboid of eight barrel-like objects | −16.7% |
| Cube of six barrel-like objects | −18.2% |

One objective of this embodiment is to measure the five calibration members 130A~130E and then to compare those result of measurement with a concrete barrel containing Cs-137 and Co-60 solutions so as to obtain the differences.

As shown in Table 3, the maximum Cs-137 difference is small than −19% which is ranged within a reasonable tolerance.

In an embodiment, the aforesaid objects are slice-like objects 141 that are assembled into a large-area slice-like calibration member. As shown in FIG. 5, there are six slice-like objects 141 of 34 cm in length and 34 cm in width are to be assembled into a large-are radioactive source 140 of 102 cm in length and 68 cm in width.

In an embodiment shown in FIG. 6, a calibration member 150 of the present invention is applied for calibrating surface radioactive contamination of a larger object that can be made of various materials or a concrete wall.

TABLE 5

Applications on the surfacelarger object that can be made of various materials or a concrete wall

| Back material | Cs-137 activity (Bq) | difference (%) | Co-60 activity (Bq) | difference (%) |
|---|---|---|---|---|
| Plastic | 51052 | 3.7 | 26076 | 2.3 |
| Concret | 51052 | 3.7 | 26076 | 4.2 |
| Lead | 51052 | 2.9 | 26076 | 3.8 |

One objective of the present invention is to evaluate the back-scattering effect on the surfaces of large objects or wall that are made of various materials, such as plastic, concrete or lead, and difference thicknesses. As shown in Table 5, the maximum Cs-137 difference is small than 3.7% and the maximum Co-60 difference is small than 4.2%, by that clearly the calibration members disclosed in the present invention can be applied on the surfaces of large objects or wall that are made of various materials.

As disclosed in the above description, the calibration method S100 of the present invention uses a block-model method for arranging a plurality of barrel-like or box-like objects into a variety of reference blocks, or a plurality of small slice-like standard radioactive sources into a large-area slice-like reference object, for mimicking the surface or the interior of a bulk radiation waste from a nuclear facility that is to be decommissioned. Thereby, a calibration volume-source or a calibration slice-source can be established.

Figure 8:
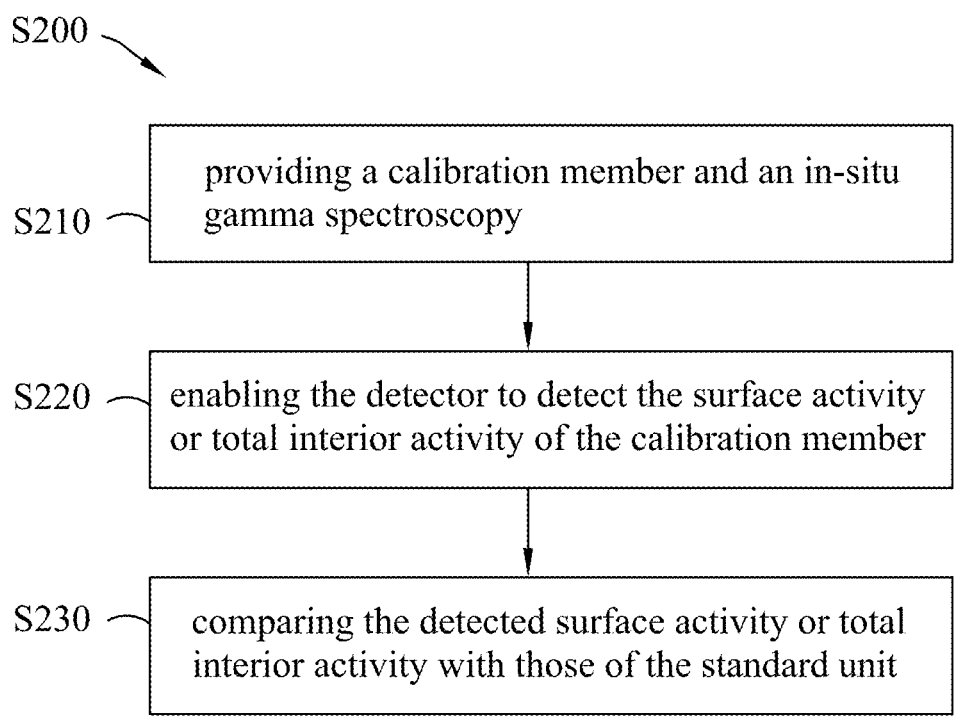
FIG. 8 is flow chart depicting steps performed in a measurement method for bulk radiation wastes according to the present invention.

FIG. 8 is flow chart depicting steps performed in a measurement method for bulk radiation wastes according to the present invention.

In FIG. 8, the measurement method for bulk radiation wastes comprises the step S210~step S230.

At step S210, a calibration member and an in-situ gamma spectroscopy are provided, in which the calibration member is composed of a plurality of objects that are stacked into a block or a plurality of slices that are assembled into a large-area slice-like object; and the in-situ gamma spectroscopy includes a detector and a standard unit, while the standard unit is formed with geometrical parameters conforming to the calibration member, and the geometrical parameters include size, volume, shell thickness, weight, texture, and distance.

At step S220, the detector is enabled to detect the surface activity or total interior activity of the calibration member.

At step S230, the detected surface activity or total interior activity is compared with those of the standard unit.

To sum up, the present invention provides a measurement system, a calibration method and a measurement method of a bulk radiation waste, which measure total activity and surface activity of a bulk radiation waste by the use of an in-situ gamma spectroscopy directly in an on-site manner, and thereby not only the time wasted for transporting objects to be detected to a conventional container-style detection system can be saved, but also the objects that are too large no longer have to be divided into barrels or boxes so as to be carried in batch to the container-style detection system for measurement. Consequently, the cost for purchasing the container-style detection system and the cost for acquiring a fixed location for housing the container-style detection system can be saved.

In addition, the present invention provides a calibration method capable of using a block-model method to arrange a plurality of barrel-like or box-like objects into a variety of reference blocks, or a plurality of small slice-like standard radioactive sources into a large-area slice-like reference object, for mimicking the surface or the interior of a bulk radiation waste from a nuclear facility that is to be decommissioned. Thereby, a calibration volume-source or a calibration slice-source can be established Moreover, the present invention provides a measurement method for measuring total activity and surface activity of a bulk radiation waste by the use of an in-situ gamma spectroscopy, and thereby not only the time wasted for transporting objects to be detected to a conventional container-style detection system can be saved, but also the objects that are too large no longer have to be divided into barrels or boxes so as to be carried in batch to the container-style detection system for measurement. Consequently, the cost for purchasing the container-style detection system and the cost for acquiring a fixed location for housing the container-style detection system can be saved.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A measurement system for bulk radiation wastes, comprising:
   a calibration member, composed of a plurality of objects that are assembled and arranged into the calibration member, wherein the calibration member is composed of the plurality of objects that are stacked into a block, or is composed of a plurality of slices that are assembled into a large-area slice-like object if each of the objects is a slice-like piece; and
   an in-situ gamma spectroscopy, composed of a detector and a standard member, wherein the detector is coupled to the standard member, the standard member has a surface activity or total interior activity and is formed with geometrical parameters conforming to the calibration member, and the geometrical parameters include size, volume, shell thickness, weight, texture, and distance, and wherein the in-situ gamma spectroscopy is configured for:
      detecting, by the detector, the surface activity or total interior activity of the calibration member; and
      comparing the detected surface activity or total interior activity with the surface activity or total interior activity of the standard member.

2. The measurement system of claim 1, wherein in a condition when the plural objects pass a comparison of activity measurement, the plural objects are stacked into the calibration member.

3. The measurement system of claim 2, wherein in a condition when each of the plural objects is a box-like object, the plural box-like objects are stacked and arranged into a shape selected from the group consisting of: a cuboid and a cube.

4. The measurement system of claim 2, wherein in a condition when each of the plural objects is a barrel-like object, the plural barrel-like objects are stacked and arranged into a cubical object.

5. The measurement system of claim 4, wherein the cubical object is an object selected from the group consisting of: a cube, a cube of four barrel-like objects, a cuboid of six barrel-like objects, a cuboid of eight barrel-like objects, and a cube of eight barrel-like objects.

6. The measurement system of claim 1, wherein in a condition when each of the plural objects is a slice-like object and is conforming to a national radioactivity standard of Cs-137 and Co-60, the plural slice-like objects are assembled and arranged into a large-area slice-like calibration member.

7. A method of establishing a calibration element for correcting bulk radiation waste, comprising the steps of:
providing a plurality of objects; and
arranging the plural objects into a calibration member, wherein the calibration member is composed of the plural objects to be stacked into a block, or is composed of a plurality of slices that are assembled into a large-area slice-like object if each of the objects is a slice-like piece.

8. The calibration method of claim 7, wherein in a condition when the plural objects are to be stacked into the block, each of the plural objects is capable of passing a comparison of activity measurement.

9. The calibration method of claim 7, wherein in a condition when each of the plural objects is a slice-like object, each of the plural slice-like objects is conforming to a national radioactivity standard of Cs-137 and Co-60.

10. The calibration method of claim 7, wherein in a condition when each of the plural objects is a box-like object, the stacking of the plural box-like objects includes the step of:
stacking the plural box-like objects into a shape selected from the group consisting of: a cuboid and a cube.

11. The calibration method of claim 7, wherein in a condition when each of the plural objects is a barrel-like object, the stacking of the plural barrel-like objects includes the step of:
stacking the plural barrel-like objects into a cubical object, while allowing the cuboid object to be an object selected from the group consisting of: a cube, a cube of four barrel-like objects, a cuboid of six barrel-like objects, a cuboid of eight barrel-like objects, and a cube of eight barrel-like objects.

12. A measurement method for bulk radiation wastes, comprising the steps of:
providing a calibration member and an in-situ gamma spectroscopy, wherein the calibration member is composed of a plurality of objects that are stacked into a block or a plurality of slices that are assembled into a large-area slice-like object;
enabling the in-situ gamma spectroscopy to include a detector and a standard member, wherein the standard member has a surface activity or total interior activity and is formed with geometrical parameters conforming to the calibration member, and the geometrical parameters include size, volume, shell thickness, weight, texture, and distance;
detecting, by the detector, the surface activity or total interior activity of the calibration member; and
comparing, by the in-situ gamma spectroscopy, the detected surface activity or total interior activity with the surface activity or total interior activity of the standard member.

13. The measurement method of claim 12, wherein in a condition when the plural objects are to be stacked into the block, each of the plural objects is capable of passing a comparison of activity measurement.

14. The measurement method of claim 12, wherein in a condition when each of the plural objects is a slice, each of the plural slice-like objects is conforming to a national radioactivity standard of Cs-137 and Co-60.

15. The measurement method of claim 12, wherein in a condition when each of the plural objects is a box-like object, the stacking of the plural box-like objects includes the step of:
stacking the plural box-like objects into a shape selected from the group consisting of: a cuboid and a cube.

16. The measurement method of claim 12, wherein in a condition when each of the plural objects is a barrel-like object, the stacking of the plural barrel-like objects includes the step of:
stacking the plural barrel-like objects into a cubical object, while allowing the cuboid object to be an object selected from the group consisting of: a cube, a cube of four barrel-like objects, a cuboid of six barrel-like objects, a cuboid of eight barrel-like objects, and a cube of eight barrel-like objects.

* * * * *